Jan. 5, 1971  B. BECHTEL  3,553,688
TERRAIN AVOIDANCE RADAR SYSTEM
Filed Sept. 5, 1961  4 Sheets-Sheet 1

INVENTOR
Bartow Bechtel
BY
Stevens, Davis, Miller & Mosher
ATTORNEYS

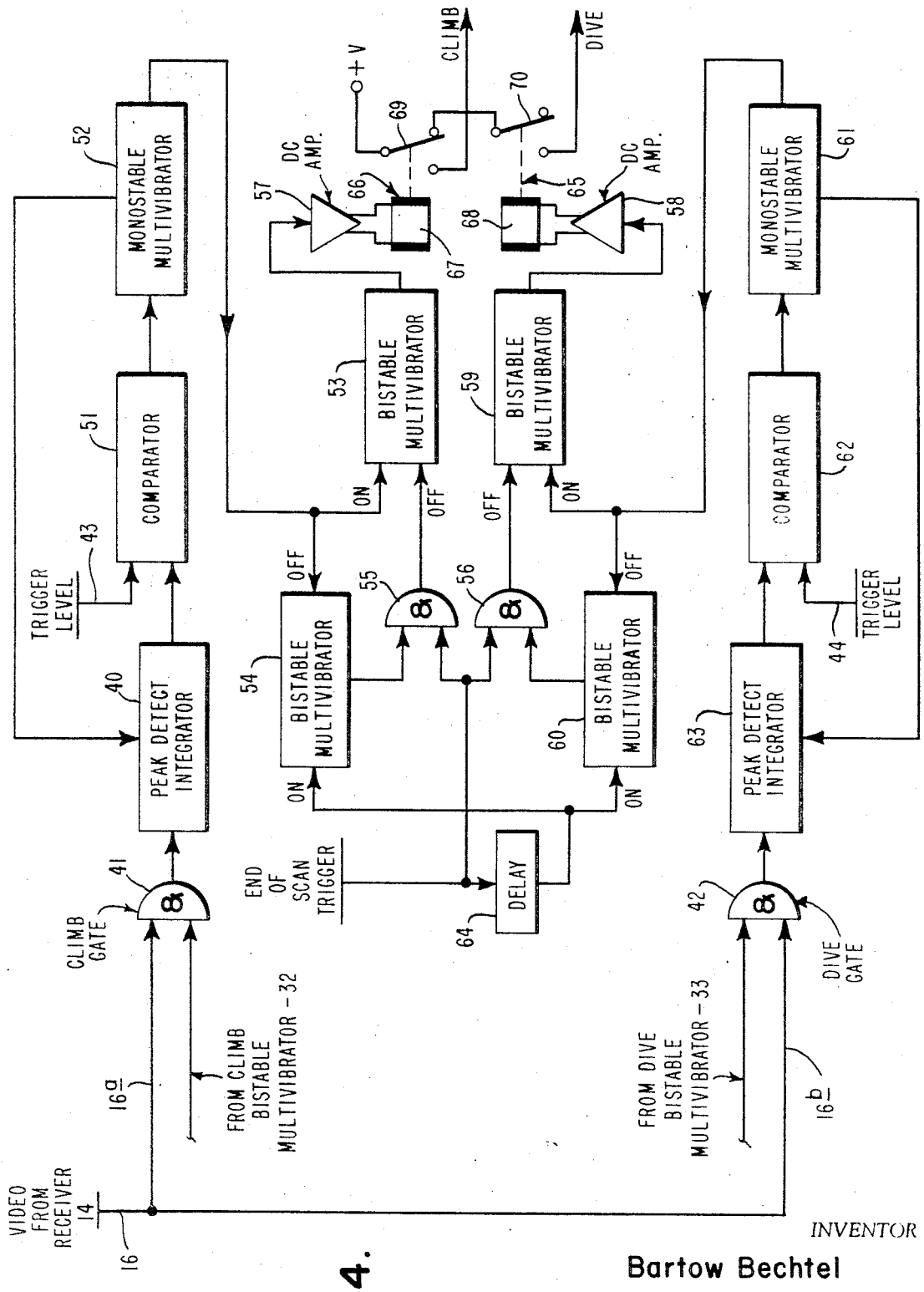

United States Patent Office 3,553,688
Patented Jan. 5, 1971

3,553,688
TERRAIN AVOIDANCE RADAR SYSTEM
Bartow Bechtel, Mountain View, Calif., assignor to Texas Instruments Incorporated, Dallas, Tex., a corporation of Delaware
Filed Sept. 5, 1961, Ser. No. 137,437
Int. Cl. G01s 9/02
U.S. Cl. 343—7                                    15 Claims The present invention relates to radar systems and more particularly to a terrain avoidance system for monitoring and detecting terrain and other obstacles in the path of an airborne vehicle and automatically programming the flight of the vehicle to avoid the detected obstacles.

Radar systems which are intended for installation in an aircraft to automatically control its flight path must meet many severe requirements. Not only must such systems possess a high degree of dependability, but they must also have relatively little complexity, light weight, and small size. Above all, the systems must fulfill their intended functions in all respects with a minimum possibility of failure.

The basic consideration in the operation of a terrain avoidance radar system is that of maintaining the airborne vehicle at a prescribed altitude above the terrain or obstacles arising therefrom under all conditions. In order to accomplish this result, the terrain avoidance radar system must maintain the airborne vehicle within prescribed altitude limits over level terrain, detect obstacles in the path of the vehicle in a sufficiently short period of time to permit the vehicle to attain the desired altitude above the obstacle, and yet allow sufficient time to prevent undue stressing of the structural members of the airborne vehicle. After passing by the obstacle, the system must be able to return the vehicle to the proper altitude relative to new conditions. All obstacles in the flight path of the vehicle must be monitored until they are of no further interest, so far as the flight path of the vehicle is concerned, and the radar system must locate new obstacles and produce the required responses to them as dictated by the particular terrain encountered. Thus, the system must be able to monitor all obstacles at all times over its entire range of operation. Further, the system must be able to utilize, to the extent possible, existing systems in the airborne vehicle in order to minimize the additional equipment required.

It is a principal object of the present invention to provide a terrain avoidance radar system for airborne vehicles which best satisfies all of the above enumerated requirements.

It is a further object of the present invention to provide a relatively simple, light weight, and compact automatic terrain avoidance system which is highly dependable and which is completely compatible with the existing radar equipment employed in both drone and manned aircraft.

It is another object of the present invention to provide a terrain avoidance radar system for airborne vehicles which will continually monitor an obstruction in the path of the vehicle and which will generate the appropriate control action from the time the obstruction first comes into the range of the radar until it is no longer of any interest with regard to the safety of the airborne vehicle.

It is a still further object of the present invention to provide a terrain avoidance radar system for aircraft which detects the presence of obstacles located within a unique predetermined radar scan profile, or template, having a "Climb Sector" and a "Dive Sector" and which system automatically causes the aircraft to climb when an obstacle is detected within the "Climb Sector" and effects a descent of the aircraft when an object is detected within the "Dive Sector" of the scan profile.

It is still another object of the present invention to provide a terrain avoidance radar system which does not measure angle and range of an obstacle to determine the relative altitude of an airborne vehicle, but which merely detects the presence of the obstacle and programs a climb to the vehicle until the vehicle is on a flight vector which assures that the obstacle passes below the vehicle by a preselected altitude.

In accordance with objectives set forth above, the terrain avoidance system of the present invention comprises means for sending radar signals into a predetermined region in front of an airborne vehicle in order to detect the presence of an obstacle in the predetermined region, the profile of the predetermined region in a vertical plane passing through the flight vector of the airborne vehicle being divided into a "Climb Sector" and a "Dive Sector," the line dividing the sectors from one another being a preselected "Set Clearance Altitude" below the flight vector of the airborne vehicle, means for receiving the return radar signals, a flight control logic network for deriving from the received radar signals "Climb" and "Dive" flight control command signals to control the flight path of the airborne vehicle so as to avoid the detected obstacles, a first bistable device, means for placing the first bistable device in its first stable state when a radar pulse is emitted into the predetermined region, a second bistable device, means for placing the first bistable device in its second stable state and for placing the second bistable device in its first stable state after sufficient time has elapsed for the emitted radar pulse to travel to a point on the line dividing the sectors from one another and back to the airborne vehicle, and means for placing the second bistable device in its second stable state after sufficient time has elapsed for the emitted radar pulse to travel to the extremity of the predetermined region and back to the airborne vehicle. The first and second bistable devices control the generation of the flight control command signals in the flight control logic network so that a "Climb" command signal is generated when an obstacle is detected within the "Climb Sector" and a "Dive" command signal is produced when an obstacle is detected in the "Dive Sector."

Other and further objects, advantages, and characteristic features of the present invention will become readily apparent from consideration of the following detailed description of a preferred embodiment of the invention when taken in conjunction with the appended drawings in which:

FIG. 4 is a block diagram of the elements comprising the flight control logic block of FIG. 2.

Figure 1:
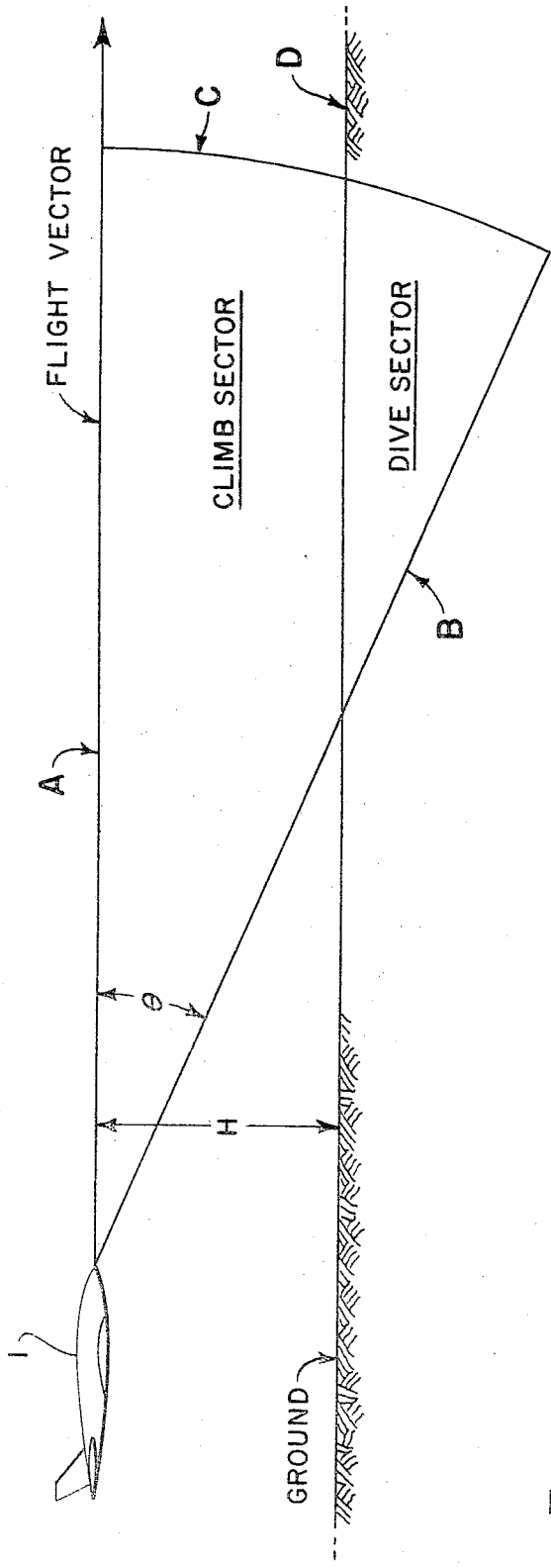
FIG. 1 is a vertical profile diagram illustrating the profile, or template, scanned by the radar antenna of the terrain avoidance system of the present invention.

Referring to FIG. 1 of the accompanying drawings, there is illustrated a diagram which will be used in describing the basic functioning of the system of the present invention. An aircraft 1, and in this particular embodiment of the invention the aircraft is taken to be a drone, is to be automatically maintained by the system of the invention essentially at a predetermined altitude H above the surface of the surrounding terrain, designated as "ground" in FIG. 1. The aircraft 1 is provided with an antenna for transmitting and receiving pulses of electromagnetic energy. The antenna transmits pulses at a predetermined repetition rate, which for purposes of illustration is stated to be 2.4 kilocycles per second, and is swept through a predetermined vertical scan from the flight vector of the aircraft to an angle of $\theta$, for example, below the flight vector. In a practical system constructed according to the principles of the present invention θ might be around 15°. The antenna scan is, of course, referenced or stabilized to the flight vector of the aircraft. An instrument is provided aboard the aircraft 1 for measuring the angle of attack of the aircraft, and this angle information is fed to the system for controlling the movement of the antenna so that the antenna, at the upper limit of its movement, is aligned with the flight vector rather than with the axis of the aircraft.

The antenna moves through a complete scan cycle, i.e., from its upper limit to its lower limit and then back to its upper limit of movement at a predetermined rate, which for purposes of example is taken to be one cycle per second. Thus, the antenna scans a predetermined sector in front of the aircraft twice each second, once during its downward movement and once on its upward movement. A typical range of the radar, i.e., from the aircraft 1 to the curved front C of the scan profile, may be around 15,000 feet, while the altitude H varies between 400 and 1500 feet, preferably being around 1000 feet.

The scan profile is shown in FIG. 1. The upper limit of the profile is defined by the line A extending from the aircraft 1 along the flight vector of the aircraft. The extent, or range, of the scan is determined by the curved line C which defines an arc of a circle whose center lies at the antenna on the aircraft 1 and whose radius is equal to the distance from the aircraft 1 to the arc C. The lower limit of the scan profile is defined by the line B which extends from the aircraft 1 at a predetermined angle θ below the flight vector. The scan profile is divided into two sectors by a line D parallel to the flight vector and located a predetermined distance H below the flight vector. The distance H is termed the "Set Clearance Altitude," since it is desired that the aircraft be maintained this distance above the surrounding terrain which, although illustrated as level ground in FIG. 1, may be any obstacle above which it is desired to fly the airborne vehicle.

The area within the scan profile which is located above the line D is designated as the "Climb Sector," and if the radar locates any object within this sector, a "Climb" command signal is generated which programs a climb for the aircraft. The area within the scan profile which is below the line D is termed the "Dive Sector," and when an object is detected in the "Dive Sector" and no objects are detected in the "Climb Sector," a "Dive" command signal is generated which programs a descent for the aircraft.

Figure 2:
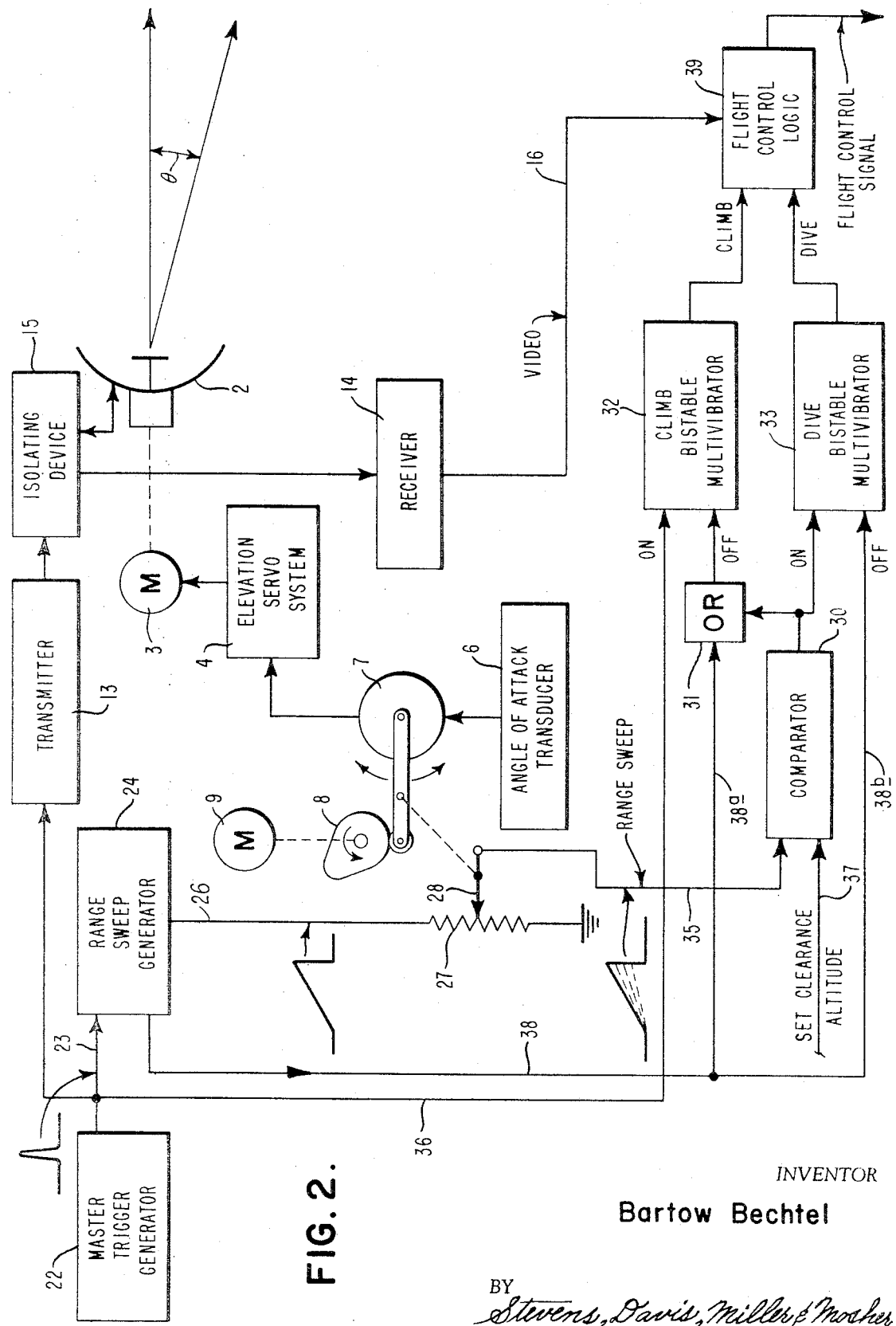
FIG. 2 is a schematic block diagram of the system of the invention.

Referring now to FIG. 2, it may be observed that the system of the present invention includes a radar antenna 2 for sending radar pulses into space in front of the aircraft and for receiving the return radar pulses from objects, which may be terrain or other obstacles, located therein. The antenna 2 is moved through an angle θ by means of a servo motor 3 which is supplied with control signals from an elevation servo system 4. The scan of the antenna 2 is referenced, or stabilized, to the flight vector of the aircraft by means of an angle of attack transducer 6 through a synchro transmitter 7. The transmitter 7 is provided with a rotor which supplies electric signals to the elevation servo system 4 and a stator which receives its electrical excitation from the synchro output in the angle of attack transducer 6. The rotor is cycled back and forth through the angle θ at a frequency of one cycle per second by means of a continuously rotating cam 8 driven by a motor 9. Therefore, the electric signals applied to the elevation servo 4 are a function of the movement of the synchro rotor in conjunction with the electrical synchro signal supplied to the stator by the transducer 6 which measures the angle between the axis of the aircraft and the desired flight vector.

The portion of the system for generating the radar signals and receiving the return signals is conventional, and for purposes of illustration a monopulse resolution improvement radar (MRI) is shown. Such a radar system comprises a master trigger, or pulse repetition frequency (PRF), generator 22 which activates a transmitter 13 to initiate the emission of the radar pulses which are fed through an isolating device 15 to the radar antenna 2. The isolating device 15 is used to prevent the transmitted pulses from being sent to the receiver and may comprise conventional means for such purposes, for example, a circulator or a blanking pulse generator. The pulsing of the transmitter 13 causes a radar carrier signal pulse to be transmitted from the radar antenna 2, and the electromagnetic energy radiated from the antenna 2 travels through space until striking the terrain or other obstacle. Reflected radar pulses are received by the antenna 2 and sent via the isolating device 15 to the receiver 14.

At the same time that the master trigger generator 22 pulses the transmitter 13 to initiate the emission of a radar pulse, the trigger generator 22 also sends a pulse via the lead 23 to a range sweep generator 24 which includes a sawtooth, or ramp generator and which synchronizes the oscillations of the sawtooth generator with the pulse repetition frequency of the radar system. The ramp voltages generated by the range sweep generator 24 are applied to a lead 26 which is grounded through a potentiometer 27. The duration of each ramp applied to the lead 26 from the range sweep generator 24 is equal to the travel time required for a radiated pulse from the antenna 2 to travel from the aircraft 1 to a point on the arc C of FIG. 1 and back to the aircraft.

The potentiometer 27 is provided with a movable tap 28 which is mechanically coupled to the synchro 7 to synchronize the movement of the tap 28 with the vertical movement of the antenna 2. This amplitude modulates the ramp waveforms on the lead 26 in accordance with the movement of the antenna 2. Thus, when the antenna is directed along the flight vector, the potentiometer tap 28 will be at ground, and the amplitude of each ramp will be zero. After the antenna has moved to a directing position slightly below the flight vector, the potentiometer tap 28 will have been moved upward slightly, and the amplitude of each ramp will reach a small positive value. As the antenna scans downward, the slope (and hence the final amplitude) of each successive ramp becomes slightly greater than the preceding one, reaching a maximum when the antenna has been moved to the lower extremity of its scan.

The voltage appearing at the tap 28 is applied via a lead 35 to one input of a comparator circuit 30. A predetermined voltage indicative of the desired "Set Clearance Altitude" H for the aircraft is applied to the other input of the comparator via a lead 37, and the comparator 30 functions to compare its varying input voltage appearing on the lead 35 with its preset reference input voltage appearing on the lead 37. As long as the voltage on lead 37 is greater than the voltage on the lead 35, no output will be provided by the comparator 30. However, when the voltage on the lead 35 increases to the point where it equals the preset reference voltage on the lead 37, the comparator 30 will then furnish an output pulse. The output from the comparator 30 is applied to the ON input of a "Dive" bistable multivibrator 33 and to one input of an "OR" gate 31, the output of which is connected to the OFF input of a "Climb" bistable multivibrator 32.

When the range sweep generator 24 is pulsed to initiate each ramp voltage, trigger pulses from the master trigger generator 22 are also applied via a lead 36 to the ON input of the "Climb" bistable multivibrator circuit 32. At the end of each ramp voltage, the range sweep generator 24 furnishes a reset pulse to a lead 38, and this pulse is applied via lead 38a through the "OR" gate 31 to the OFF input of the "Climb" bistable multivibrator 32, and also via the lead 38b to the OFF input of the "Dive" bistable multivibrator 33. Output signals from the bistable multivibrators 32 and 33 are applied via the "Climb" and "Dive" leads, respectively, to a flight control logic network 39, the return radar video signals from the receiver 14 being fed to the flight control logic network 39 via the lead 16. The flight control logic network 39 coordinates the return radar video signals with the "Climb" and "Dive" signals from the multivibrators 32 and 33 and accordingly derives the proper flight control "Climb" and "Dive" command signals to maintain the aircraft or missile in a low flight over ground terrain while avoiding abrupt projections of the ground terrain.

Figure 3:
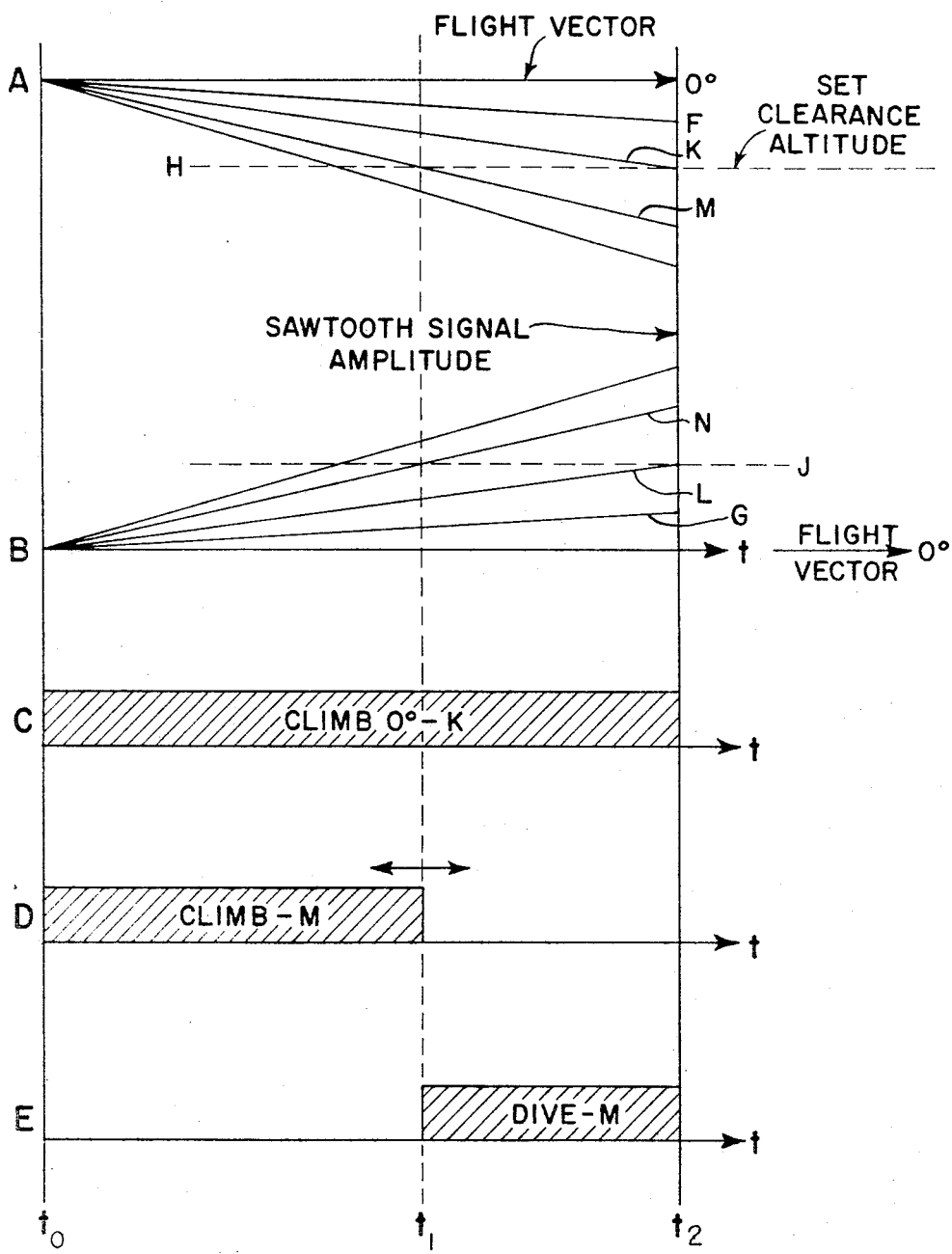
FIG. 3 is a series of graphs utilized in explaining the operation of the system of FIG. 2.

The operation of the system of FIG. 2 will be best understood with reference to the graphs of FIG. 3. Upon the application of a trigger pulse from the master trigger generator 22 to the lead 23 at time $t_0$, the range sweep generator 24 begins to generate a ramp voltage, and at the same time the trigger generator 22 sends a trigger pulse via the lead 36 to set the "Climb" bistable multivibrator 32 to the ON state. Assume, for the moment, that at the beginning of this particular ramp, the boresight of the antenna 2 lies along the line F of Graph A of FIG. 3. The tap 28 of potentiometer 27 is in such a position that the voltage on the lead 35 follows the curve G in Graph B of FIG. 3. The "Set Clearance Altitude" is indicated by the dashed line H in Graph A, while the "Set Clearance Altitude" indicating voltage applied to the comparator 30 via the lead 37 is indicated by the dashed line J of Graph B. It may be seen that the voltage defined by the line G of Graph B does not exceed the "Set Clearance Altitude" voltage defined by the line J during any given ramp interval for this particular angle of antenna scan. This means that within the range of the system the pulses transmitted by the antenna 2 do not descend to the set clearance altitude, and therefore, the "Climb" bistable multivibrator 32 is maintained in the ON state during the entire ramp interval (see Graph C). Any reflected signals received by the antenna 2 during this interval would of necessity indicate an obstruction within the range of the radar lying in the "Climb Sector" of the scan profile. If such a signal were returned to the antenna during the interval that the "Climb" bistable multivibrator 32 is maintained in the ON state, the flight control logic 39 will generate a "Climb" flight control command signal in a manner to be described in more detail below.

As long as the boresight of the antenna 2 is directed along a path which does not intersect the "Set Clearance Altitude" of the system within the range of the apparatus, the "Climb" bistable multivibrator 32 is maintained in the ON state for the entire ramp interval, this condition being indicated by the Graph C in FIG. 3. The portion of the scan during which the "Climb" multivibrator 32 is ON for the entire ramp interval is that area lying above the line K in Graph A (below the line L in Graph B).

Now, assume that the boresight of the antenna 2 lies along line M of Graph A so that it intersects the "Set Clearance Altitude" H within the range of the system. The ramp voltage on the lead 35, illustrated by line N of Graph B, increases sufficiently to equal the "Set Clearance Altitude" voltage (line J of Graph B), which is applied to the comparator 30 via the lead 37, at the time $t_1$. At this time the comparator 30 produces an output pulse which is applied through the "OR" gate 31 to set the "Climb" bistable multivibrator 32 to the OFF state. The comparator output pulse also sets the "Dive" bistable multivibrator 33 to the ON state, and when the "Dive" multivibrator 33 is in the ON condition, video signals applied to the flight control logic network 39 via the lead 16 will cause generation of "Dive" flight control command signals by the flight control logic 39.

As is illustrated in FIG. 3, when the boresight of the antenna 2 is so located that it directs radar pulses along the line M, the "Climb" multivibrator 32 is maintained ON for a time interval from $t_0$ to $t_1$ (see Graph D), whereas the "Dive" multivibrator 33 is switched to the ON state at $t_1$ and remains ON until the range sweep generator 24 applies a reset pulse to the lead 38 at $t_2$, indicating that the extremity of the scan profile has been reached (see Graph E). At the end of the range sweep ramp interval, time $t_2$, the reset pulse on the lead 38a will pass through the "OR" gate 31 and return the "Climb" multivibrator 32 to the OFF state for the case illustrated by Graph C of FIG. 3, the "Climb" multivibrator having already been returned to the OFF state by the comparator output pulse at $t_1$ for the case illustrated in Graph D. The reset pulse from the range sweep generator 24 will be applied via the lead 38b to set the "Dive" bistable multivibrator 33 to the OFF state at $t_2$ for the case illustrated in Graph E. The "Dive" bistable multivibrator 33 will never have been set to the ON state in a given ramp interval for the case illustrated in Graph C, since for this case the range sweep ramp voltage on the lead 35 will not achieve a sufficient magnitude to trigger the comparator 30.

It should be apparent that numerous variations of the particular arrangement illustrated in FIG. 2 are possible without departing from the scope of the invention. For example, the individual "Climb" and "Dive" bistable multivibrators 32 and 33 might be replaced by a single bistable multivibrator which furnishes "Climb" output signal to the flight control logic 39 when it is in the ON state and which furnishes a "Dive" signal to the flight control logic 39 when it is in the OFF condition.

The flight control logic system 39 is used to generate the signals for controlling the maneuvering of the aircraft or missile over the terrain in accordance with the return radar signals from the receiver 14 and the "Climb" and "Dive" control signals from the bistable multivibrators 32 and 33, respectively. Although many types of logic systems may be suitable for this purpose, a preferred embodiment of the flight control logic is shown in FIG. 4. This flight control logic provides an ON-OFF type of control, i.e., when an object is detected in the "Climb Sector," a "Climb" command signal is sent to the autopilot, whereas when an object is detected in the "Dive Sector," a "Dive" command is given.

The flight control logic system of FIG. 4 includes a "Climb" channel for generating the "Climb" command signals and a "Dive" channel for generating the "Dive" command signals. The input to the "Climb" channel comprises a "Climb" "AND" gate 41 to which is fed via lead 16a the return radar video pulses from the receiver 14 and a signal from the output of the "Climb" bistable multivibrator 32. The output from the "Climb" gate 41 is applied to a peak detecting integrator circuit 40, which may be a conventional RC integrating circuit. The output from the peak detecting integrator 40 is fed to one input of a comparator circuit 51, which may be of the same type as the comparator 30 of FIG. 2. The other input to the comparator 51, termed "Trigger Level" is provided on a lead 43 to which is fed that reference voltage at which it is desired that the comparator 51 produce an output pulse. The output from the comparator 51 is sent to a monostable multivibrator 52, which is a conventional blocking oscillator having only a single stable state so that when an input pulse is applied thereto, the multivibrator will provide a high voltage output for a selected interval of time, after which it will automatically return to its stable state in which the high voltage output is no longer present. The output from the monostable multivibrator 52 is fed to both the ON input for bistable multivibrator 53 and the OFF input for bistable multivibrator 54, the multivibrators 53 and 54 being of the same type as the bistable multivibrators 32 and 33. The output from the monostable multivibrator 52 is also fed back to the peak detecting integrator 40 to reset the peak detecting integrator 40 when the monostable multivibrator 52 is triggered.

The output (ON side) of the bistable multivibrator 54 is gated with an "End of Scan Trigger" pulse in an "AND" gate 55, after which it is fed to the OFF input of the bistable multivibrator 53, the ON input to the bistable multivibrator 54 being fed by the "End of Scan Trigger" pulse after it has passed through a delay network 64. The output (ON side) of the bistable multivibrator 53 is applied to a conventional DC amplifier 57, and its amplified output signal is used to activate a relay solenoid 67 in "Climb" relay 66 to move relay contact arm 69 to a closed position in which a "Climb" command signal is sent to the autopilot.

The "Dive" channel is constructed in the same manner as the "Climb" channel and comprises a "Dive" "AND" gate 42, a peak detecting integrator 63, a comparator 62 having a preset trigger level 44, monostable mutivibrator 61, bistable multivibrators 59 and 60, "AND" gate 56, DC amplifier 58, and a "Dive" relay 65 having a relay solenoid 68 and contact arm 70. It should be pointed out that although relays are illustrated as being used for generating the "Climb" and "Dive" command signals, the "Climb" and "Dive" command signals may be completely generated electronically, for example, by feeding the outputs from the multivibrators 53 and 59 to appropriate electronic (preferably transistorized) switching circuitry.

In the operation of the flight control logic of FIG. 4, when an object is present inside "Climb Sector," the return radar pulse from the receiver 14 is fed via the lead 16a to the "Climb" gate 41 and via the lead 16b to the "Dive" gate 42. Since the bistable multivibrator 32 will maintain the "Climb" gate 41 open as long as the area within the "Climb Sector" is being investigated, the return radar signal will pass through the "Climb" gate 41 and be registered in the peak detecting integrator 40. The flight control logic is arranged so that a predetermined number of return radar signals passing through the "Climb" gate 41 will indicate the presence of an object within the "Climb Sector." In a preferred embodiment of the invention the trigger level on lead 43 to the comparator 51 is set so that the comparator 51 will produce an output when the peak detecting integrator 40 has built up that voltage corresponding to the passage of ten received radar pulses through the gate 41. After ten such pulses have been counted by the integrator 40, the voltage level will be sufficient to trigger the comparator 51, and the comparator 51 will then apply a trigger pulse to the monostable multivibrator 52. After being triggered, the monostable multivibrator 52 resets the peak detecting integrator 40 to its initial condition to prepare it for registering the next ten pulses, which pass through the "Climb" gate 41. An output from the monostable multivibrator 52 also sets the bistable multivibrator 53 to the ON state and the bistable multivibrator 54 to the OFF state. When the bistable multivibrator 53 is turned ON, it produces an output which is amplified by the DC amplifier 57, and the amplified output signal causes the relay solenoid 67 to close the contact arm 69 and thereby generate a "Climb" command signal for the autopilot.

It is desired that the "Climb" command signal remain activated until a complete scan (either up or down) indicates that no object remains in the "Climb Sector," thereby preventing the intermittent application of the "Climb" command signal. Thus, when the antenna has reached the extremities of its scan, an "End of Scan Trigger" pulse is generated, for example, by allowing a member whose movement corresponds to that of the antenna, to trip a microswitch, and the resultant "End of Scan Trigger" pulse is applied to the "AND" gate 55. However, since the bistable multivibrator 54 has been placed in the OFF condition by the output from the monostable multivibrator 52, the "End of Scan Trigger" pulse will not be able to pass through the "AND" gate 55 and hence will not place the bistable multivibrator 53 in the OFF state. This will prevent termination of the "Climb" command signal. However, the "End of Scan Trigger" pulse is also applied to the delay network 64, and the delayed "End of Scan Trigger" pulse is applied to the ON input for the bistable multivibrator 54. This sets the bistable multivibrator 54 to the ON state, with the result that if, during the next scan of the antenna, the bistable multivibrator 54 is not returned to the OFF state due to an output pulse from the monostable multivibrator 52 (indicating a detected object within the scan profile), the next "End of Scan Trigger" pulse will pass through the "AND" gate 55 and will reset the bistable multivibrator 53 to the OFF state, thereby allowing the relay contact 69 to open and thus terminate the "Climb" command output signal.

The "Dive" channel portion of the flight control logic of FIG. 4 operates in the same manner as the "Climb" channel. Thus, when an object is detected in the "Dive Sector" (which is indicated by the accumulation in the peak detecting integrator 63 of ten return radar pulses), the relay arm 70 is closed, and a "Dive" command signal is generated. Note, the arrangement of the relay contact arms 69 and 70 is such that in the event the logic circuitry would attempt to generate both a "Climb" and a "Dive" output signal at the same time (which is quite possible since objects might be detected in both the "Climb Sector" and the "Dive Sector" at the same time), the "Climb" output will prevail due to the arrangement of the relays 66 and 65. This is true because when the relay contact 69 is closed, a "Climb" command signal is generated, and the application of voltage to the "Dive" command generating portion is prevented regardless of the position of the relay contact arm 70.

The system provided by the present invention possesses numerous advantages over prior art computing terrain avoidance systems in which the radar supplies range and angle information, computes the relative height of an obstacle, and issues an appropriate command based on the aircraft response capabilities. With the system of the present invention, if vertical downward winds suddenly cause the aircraft to accelerate downward, the ground immediately moves into the "Climb Sector," and the aircraft is at once responding to a "Climb" command signal. Overshoot is minimized because the aircraft is returned rapidly to its set clearance altitude. Except when obstacles exist, the command signals are generated a very short distance in front of the aircraft in order to make possible very accurate altitude determinations. Thus, the aircraft is readily maintained in a low flight over ground terrain and automatically guided over any abrupt projections of the ground terrain.

Although the present invention has been shown and described with reference to a particular embodiment, nevertheless various changes and modifications obvious to those skilled in the art are deemed to be within the spirit, scope and contemplation of the invention.

What is claimed is:

1. A terrain avoidance system for an airborne vehicle comprising means for investigating a predetermined region in front of said airborne vehicle in order to detect and continuously monitor the presence of an obstacle in said predetermined region, the profile of said predetermined region in a vertical plane passing through the flight vector of said airborne vehicle being divided into an upper sector and a lower sector, the line dividing said sectors from one another being a preselected distance below the flight vector of said airborne vehicle, means for continuously obtaining signals indicative of whether obstacles exist in said upper and lower sectors, and means for automatically controlling the flight path of said airborne vehicle in accordance with said signals to avoid the detected obstacles.

2. A terrain avoidance radar system for an airborne vehicle comprising an antenna for transmitting at a predetermined repetition rate pulses of electromagnetic energy to be reflected from bodies in the path of the transmitted pulse energy and for receiving the reflected pulses, means for cyclically moving said antenna through a predetermined vertical angle with respect to the flight vector of said airborne vehicle and according to a sinusoidal function having a frequency considerably less than the repetition rate of said pulses, the vertical scan profile of said antenna being divided into an upper sector and a lower sector, the line dividing said sectors from one another being a preselected distance below the flight vector of said airborne vehicle, means for producing a first electrical signal when a reflected pulse signal is received by said antenna from an object in said upper sector, and means for producing a second electrical signal when a reflected pulse signal is received by said antenna from an object in said lower sector.

3. A terrain avoidance radar system for an airborne vehicle according to claim 2 and having means for causing the angle of the flight vector of the airborne vehicle to be increased with respect to the horizontal in response to said first electrical signal, and means for causing the angle of the flight vector of the airborne vehicle to be decreased with respect to the horizontal in response to said second electrical signal.

4. A terrain avoidance radar system for an airborne vehicle comprising means for sending radar signals into at least a predetermined region in front of said airborne vehicle to detect and continuously monitor the presence of an obstacle in said predetermined region, at least a portion of the boundary for said predetermined region lying at a distance from said airborne vehicle which varies with its angular position with respect to said airborne vehicle, means for continuously receiving the return radar signals, flight control logic means for deriving from the received radar signals flight control command signals to control the flight path of said airborne vehicle to avoid detected obstacles, at least one bistable device for controlling the generation of said flight control command signals in said flight control logic means, means for placing said bistable device in a first stable state when a radar pulse is emitted into said predetermined region, and means for placing said bistable device in a second stable state after sufficient time has elapsed for said radar pulse to travel to a point on the boundary for said predetermined region and back to said airborne vehicle.

5. A terrain avoidance radar system according to claim 4 wherein said means for placing said bistable device in said second stable state comprises means for generating a ramp voltage when a radar pulse is emitted into said predetermined region, means for varying the slope of said ramp voltage as a function of time in accordance with a predetermined pattern, and means for comparing said ramp voltage with a predetermined voltage and for producing a pulse when said ramp voltage equals said predetermined voltage.

6. A terrain avoidance radar system for an airborne vehicle comprising means for sending radar signals into a predetermined region in front of said airborne vehicle in order to detect and continuously monitor the presence of an obstacle in said predetermined region, the profile of said predetermined region in a vertical plane passing through the flight vector of said airborne vehicle being divided into an upper sector and a lower sector, the line dividing said sectors from one another being a preselected distance below the flight vector of said airborne vehicle, means for continuously receiving the return radar signals, flight control logic means for deriving from the received radar signals flight control command signals to control the flight path of said airborne vehicle to avoid detected obstacles, at least one bistable device for controlling the generation of said flight control command signals in said flight control logic means, means for placing said bistable device in a first stable state when a radar pulse is emitted into said predetermined region, and means for placing said bistable device in a second stable state after sufficient time has elapsed for said radar pulse to travel to a point on said line dividing said sectors from one another and back to said airborne vehicle.

7. A terrain avoidance radar system for an airborne vehicle comprising an antenna for transmitting at a predetermined repetition rate pulses of electromagnetic energy to be reflected from bodies in the path of the transmitted pulse energy and for receiving the reflected pulses, means for cyclically moving said antenna through a predetermined vertical angle with respect to the flight vector of said airborne vehicle and according to a sinusoidal function having a frequency considerably less than the repetition rate of said pulses, the vertical scan profile of said antenna being divided into an upper sector and a lower sector, the line dividing said sectors from one another being a preselected distance below the flight vector of said airborne vehicle, flight control logic means for deriving from the received radar signals flight control command signals to control the flight path of said airborne vehicle to avoid the detected obstacles, a first bistable device, a second bistable device, means for maintaining said first bistable device in its first stable state while said antenna is scanning said upper sector only and for maintaining said second bistable device in its first stable state while said antenna is scanning said lower sector only, said first and second bistable devices controlling the generation of said flight control command signals in said flight control logic means.

8. A terrain avoidance radar system for an airborne vehicle comprising an antenna for transmitting at a predetermined repetition rate pulses of electromagnetic energy to be reflected from bodies in the path of the transmitted pulse energy and for receiving the reflected pulses, means for cyclically moving said antenna through a predetermined vertical angle with respect to the flight vector of said airborne vehicle and according to a sinusoidal function having a frequency considerably less than the repetition rate of said pulses, the vertical scan profile of said antenna being divided into an upper sector and a lower sector, the line dividing said sectors from one another being a preselected distance below the flight vector of said airborne vehicle, flight control logic means for deriving from the received radar signals flight control command signals to control the flight path of said airborne vehicle to avoid detected obstacles, at least one bistable device for controlling the generation of said flight control command signals in said flight control logic means, means for placing said bistable device in a first stable state when a radar pulse is emitted into said predetermined region, and means for placing said bistable device in a second stable state after sufficient time has elapsed for said radar pulse to travel to a point on said line dividing said sectors from one another and back to said airborne vehicle.

9. A terrain avoidance radar system according to claim 8 wherein said means for placing said bistable device in said second stable state comprises means for generating a ramp voltage when a radar pulse is emitted into said predetermined region, means for varying the slope of said ramp voltage as a function of the angular position of said antenna, and means for comparing said ramp voltage with a predetermined voltage indicative of the distance between the flight vector of said airborne vehicle and said line dividing said sectors from one another and for producing a pulse when said ramp voltage equals said predetermined voltage.

10. A terrain avoidance radar system for an airborne vehicle comprising means for sending radar signals into a predetermined region in front of said airborne vehicle in order to detect and continuously monitor the presence of an obstacle in said predetermined region, the profile of said predetermined region in a vertical plane passing through the flight vector of said airborne vehicle being divided into an upper sector and a lower sector, the line dividing said sectors from one another being a preselected distance below the flight vector of said airborne vehicle, means for continuously receiving the return radar signals, flight control logic means for deriving from the received radar signals flight control command signals to control the flight path of said airborne vehicle to avoid the detected obstacles, a first bistable device, means for placing said first bistable device in its first stable state when a radar pulse is emitted into said predetermined region, a second bistable device, means for placing said first bistable device in its second stable state and for placing said second bistable device in its first stable state after sufficient time has elapsed for said radar pulse to travel to a point on said line dividing said sectors from one another and back to said airborne vehicle, and means for placing said second bistable device in its second stable state after sufficient time has elapsed for said radar pulse to travel to the extremity of said predetermined region and back to said airborne vehicle, said first and said second bistable devices controlling the generation of said flight control command signals in said flight control logic means.

11. A terrain avoidance radar system according to claim 10 wherein said flight control logic means comprises first gating means for passing received radar return signals when said first bistable device is in its said first stable state, second gating means for passing received radar return signals when said second bistable device is in its said first stable state, means for generating a first output signal in response to the passage of received radar signals through said first gating means, and means for generating a second output signal in response to the passage of received radar signals through said second gating means.

12. A terrain avoidance radar system according to claim 11 having means for causing the angle of the flight vector of said airborne vehicle to be increased with respect to the horizontal in response to said first output signal and means for causing the angle of the flight vector of said airborne vehicle to be decreased with respect to the horizontal in response to said second output signal.

13. A terrain avoidance radar system according to claim 11 wherein said first and said second output signals are produced in response to the passage of a predetermined number of received radar signals through said first and said second gating means.

14. A terrain avoidance radar system according to claim 11 and having means for maintaining said output signals at least until the completion of an entire scan of said predetermined region.

15. A terrain avoidance radar system according to claim 11 and having means for preventing the generation of said second output signal when said first output signal is generated.

References Cited
UNITED STATES PATENTS

| | | | |
|---|---|---|---|
| 2,965,894 | 12/1960 | Sweeney | 343—7 |
| 3,017,628 | 1/1962 | Landee et al. | 343—5 |
| 3,095,560 | 6/1963 | Castellini. | |

RODNEY D. BENNETT, JR., Primary Examiner

T. H. TUBBESING, Assistant Examiner